(12) United States Patent
Ebuchi et al.

(10) Patent No.: US 7,810,607 B2
(45) Date of Patent: Oct. 12, 2010

(54) ELECTRIC POWER STEERING APPARATUS

(75) Inventors: Tomoaki Ebuchi, Maebashi (JP);
Takeshi Yamamoto, Maebashi (JP);
Masahiro Maeda, Maebashi (JP)

(73) Assignee: NSK Ltd., Tokyo (JP)

( * ) Notice: Subject to any disclaimer, the term of this patent is extended or adjusted under 35 U.S.C. 154(b) by 358 days.

(21) Appl. No.: 12/090,106

(22) PCT Filed: Sep. 14, 2006

(86) PCT No.: PCT/JP2006/318298

§ 371 (c)(1),
(2), (4) Date: Apr. 14, 2008

(87) PCT Pub. No.: WO2007/043283

PCT Pub. Date: Apr. 19, 2007

(65) Prior Publication Data

US 2009/0014231 A1    Jan. 15, 2009

(30) Foreign Application Priority Data

Oct. 13, 2005    (JP)    ............... 2005-298525

(51) Int. Cl.
*B62D 5/04* (2006.01)
(52) U.S. Cl. .................. 180/444; 180/443; 310/71
(58) Field of Classification Search .......... 180/443, 180/444, 446; 310/71, 89; 361/736, 760, 361/622

See application file for complete search history.

(56) References Cited

U.S. PATENT DOCUMENTS

| 7,513,331 | B2 * | 4/2009 | Yamamoto | 180/444 |
| 2003/0127921 | A1 * | 7/2003 | Akutsu et al. | 310/68 R |
| 2005/0167183 | A1 * | 8/2005 | Tominaga et al. | 180/444 |
| 2006/0108884 | A1 * | 5/2006 | Shiino et al. | 310/89 |
| 2007/0144822 | A1 * | 6/2007 | Tominaga et al. | 180/444 |

FOREIGN PATENT DOCUMENTS

| JP | 11-115775 | * | 4/1999 |
| JP | 2003-204654 | * | 7/2003 |
| JP | 2003-523708 | * | 8/2003 |
| JP | 2003-322082 | * | 11/2003 |
| JP | 2004-66982 | * | 3/2004 |
| JP | 3638269 | * | 1/2005 |
| JP | 2005-36773 | * | 2/2006 |

* cited by examiner

*Primary Examiner*—Anne Marie M. Boehler
(74) *Attorney, Agent, or Firm*—Sughrue Mion, PLLC

(57) ABSTRACT

An electric power steering apparatus including a steering system into which steering torque is inputted, an electric motor for imparting steering assist force to the steering system, a controller for controlling a energizing state of the electric motor according to the steering torque, a terminal board electrically connected to the electric motor, and a control unit provided with a connector, wherein a mounting face of the electric motor with respect to the control unit, a mounting face of the terminal board with respect to the control unit, and a mounting face of the connector with respect to the control unit are arranged on a same plane.

6 Claims, 6 Drawing Sheets

ELECTRIC POWER STEERING APPARATUS

TECHNICAL FIELD

The present invention relates to an electric power steering apparatus including an electric motor for imparting steering assist force to a steering system, and a control unit provided with a controller for controlling energizing state of the electric motor according to steering torque of the steering system which are disposed adjacent to each other, and more particularly, to a mounting structure of the electric motor and the control unit in the electric power steering apparatus.

BACKGROUND ART

Generally, in a vehicle provided with an electric power steering apparatus, steering torque generated in a steering shaft with steering operation is detected by a torque sensor, and an electric current flowing in an electric motor is controlled by a controller according to the steering torque, whereby the electric motor allows the steering shaft to output a required steering assist force (torque) via a speed reducer.

A conventional electric power steering apparatus of this type is disclosed, for example, in Patent Document 1. In this electric power steering apparatus, an electric motor for imparting steering assist force to a steering system and a control unit provided with a controller for controlling an energizing state of the electric motor according to steering torque of the steering system are arranged in proximity to each other. In this case, there are two objects for arranging the electric motor and the control unit in proximity to each other in this manner. A first object is to make the device compact and to save cost for material for achieving cost reduction, by decreasing a length of an electric wiring provided between the two members to the least. A second object is to improve quality of the device by decreasing electric power loss, noise, heat generation, etc. From a viewpoint of these objects, this structure has been employed in many electric power steering apparatuses, in recent years.

Patent Document 1: Japanese Patent Examined Publication No. JP-B-3,638,269

DISCLOSURE OF THE INVENTION

Problems that the Invention is to Solve

However, in the conventional electric power steering apparatus disclosed in the above described Patent Document 1, amounting face of the electric motor with respect to the control unit, a mounting face of a terminal board for mounting a bus bar terminal, and a mounting face of a connector are not on a same plane. Therefore, in a manufacturing process of the electric power steering apparatus, mounting and assembling works of these members are unable to be performed in a single working step, and working efficiency is low, which has been a reason for an increase of manufacturing cost.

The invention has been made in view of the above described circumstances. An object of the invention is to provide an electric power steering apparatus in which mounting and assembling works of members in a manufacturing process of the electric power steering apparatus, specifically, the mounting and assembling works of an electric motor, a control unit, a terminal board for mounting a bus bar terminal, and a connector can be efficiently performed, whereby manufacturing cost can be reduced.

Means for Solving the Problems

According to a first aspect of the invention, there is provided an electric power steering apparatus including:

a steering system into which steering torque is inputted;

an electric motor which imparts steering assist force to the steering system;

a controller which controls an energizing state of the electric motor according to the steering torque; and a control unit provided with a terminal board and a connector which are electrically connected to the electric motor, wherein a mounting face of the electric motor with respect to the control unit, a mounting face of the terminal board with respect to the control unit, and amounting face of the connector with respect to the control unit are arranged on a same plane.

According to a second aspect of the invention, in the electric power steering apparatus according to the first aspect, the mounting face of the electric motor with respect to the control unit may be defined by a flange protruded part which is protruded from a flange part of the electric motor.

According to a third aspect of the invention, in the electric power steering apparatus according to the first aspect, respective mounting members of the electric motor, the control unit, the terminal board, and the connector can be mounted or detached with respect to the same plane by means of fastening pieces.

According to a fourth aspect of the invention, in the electric power steering apparatus according to the first aspect, a torque sensor for detecting the steering torque maybe further provided, and the connector may be connected to the torque sensor, whereby an electric signal corresponding to the steering torque is inputted into the controller via the connector.

According to a fifth aspect of the invention, in the electric power steering apparatus according to the first aspect, a signal concerning running state of a vehicle may be inputted into the controller via the connector.

According to a sixth aspect of the invention, in the electric power steering apparatus according to the first aspect, the electric motor and the control unit may be detachably connected to each other via a bus bar.

Advantage of the Invention

The electric power steering apparatus according to the invention is so constructed that the mounting face of the electric motor with respect to the control unit, the mounting face of the terminal board, and the mounting face of the connector are on the same plane. Therefore, these members can be mounted at the same time in a single working step. As the results, mounting and assembling works of the members can be efficiently performed, and hence, the manufacturing cost can be reduced.

DESCRIPTION OF REFERENCE NUMERALS AND SIGNS

Figure 1:
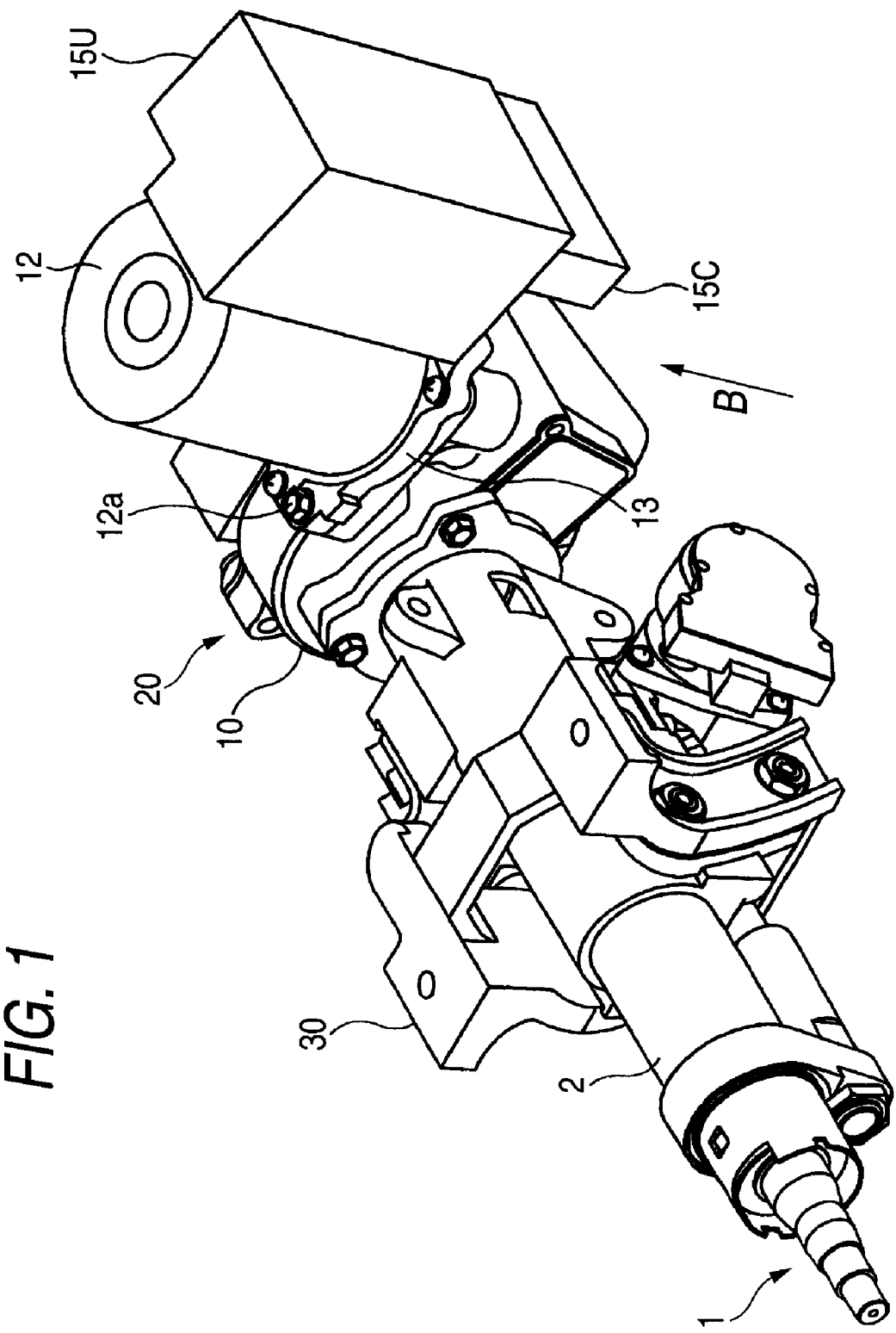
FIG. 1 is a perspective view for explaining an embodiment of an electric power steering apparatus according to the invention, as seen from a steering shaft side.

1 Steering shaft
2 Inner column
10 Housing
12 Electric Motor
12A, 12B, 12C Bus bar
13 Flange part
14 Flange protruded part
15 Controller
15B Terminal board
15C Connector
15U Control unit
20 Steering column
30 Bracket
31 Bolt
33 Wiring
L Mounting face

BEST MODE FOR CARRYING OUT THE INVENTION

Now, contents of the invention will be described referring to the attached drawings in which an embodiment of the invention is shown. It is needless to say that the invention is not limited to the below described embodiment, but its structure can be modified in various manners within a range not deviated from a scope of claims for patent.

Figure 2:
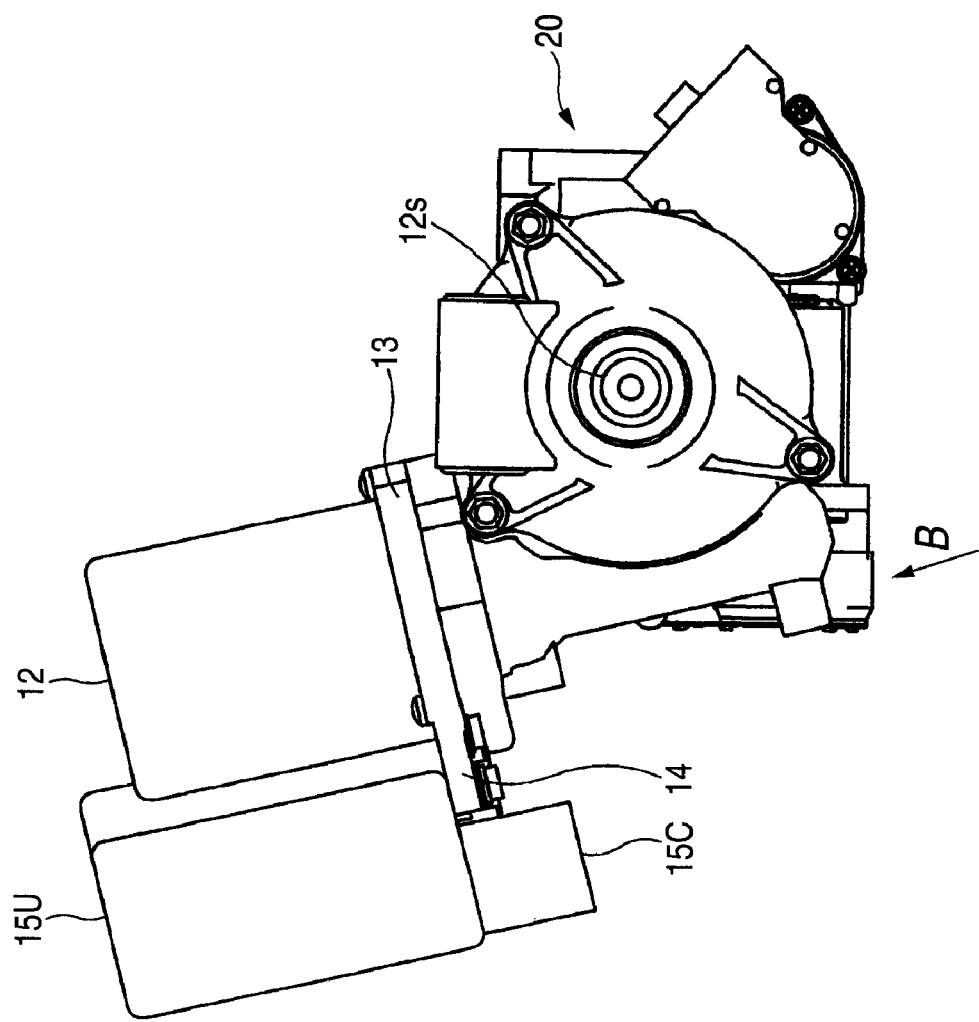
FIG. 2 is a front view for explaining the embodiment of the electric power steering apparatus according to the invention, as seen from a lower shaft side.

FIG. 1 is a perspective view of an electric power steering apparatus in an embodiment according to the invention, in a state looked down from a steering shaft side. FIG. 2 is a front view as seen from a lower shaft side.

As shown in FIGS. 1 and 2, the electric power steering apparatus includes an electric motor 12 for imparting steering assist force to a steering system, and a control unit 15U provided with a controller 15 for controlling energizing state of this motor 12. The electric power steering apparatus as shown in FIGS. 1 and 2 is an example of the electric power steering apparatus of a column assist type in which the electric motor 12 and the control unit 15U are mounted on a steering column 20 as a mounting member of a steering mechanism. In this embodiment, the steering column 20 provided with the electric power steering apparatus is further provided with a bracket 30 or the like for mounting the device to a member on a vehicle side. Structure of this bracket or the like is similar to a well-known structure, and so, its description will be omitted.

The steering column 20 includes an inner column 2 positioned adjacent to the steering shaft 1, and a housing 10 which has an outer column (not shown) into which the inner column 2 can be fitted. The inner column 2 rotatably holds the steering shaft 1. When a steering force from a driver is exerted on a steering wheel (not shown), the steering force is transmitted to the steering shaft 1. The steering shaft 1 is connected to a steering torque sensor (not shown) which can output the transmitted steering force as a detected value of the steering torque. The detected value of the steering torque is inputted into the controller 15 which is provided in the aforesaid control unit 15U.

As will be described below, the controller 15 is so constructed that an electric power can be supplied from a battery by means of an ignition switch, for example. In addition to the detected value of the steering torque, a required signal such as a detected value of vehicle speed, which has been detected by a vehicle speed sensor, is inputted into the controller 15. On the basis of these signals, the controller 15 controls the energizing state of the electric motor 12 so that assist torque corresponding to the steering torque of the steering system may be generated.

The electric motor 12 has a flange part 13 on its periphery at a side to be mounted on the mounting member of the aforesaid steering mechanism. This flange part 13 is formed at a boundary between a main body of the electric motor 12 and an output shaft 12s of the electric motor 12. This flange part 13 is formed with fitting holes 13h (see FIG. 3) in a circumferential direction. Bolts 12a which are fastening pieces are fitted into these fitting holes 13h, and screwed into threaded holes (not shown) formed in an upper part of the housing 10 of the steering column 20. According to this structure, the electric motor 12 is directly mounted to the upper part of the housing 10 in a detachable manner. Therefore, the electric motor 12 is mounted on the steering column 20 in such a manner that a distal end of the output shaft 12s is inclined with respect to an axis of the steering column 20, as shown in FIG. 2, and hence, an entirety of the electric motor steering device is inclined (in this embodiment, the main body is inclined counterclockwise, as shown in FIG. 2).

Figure 3:
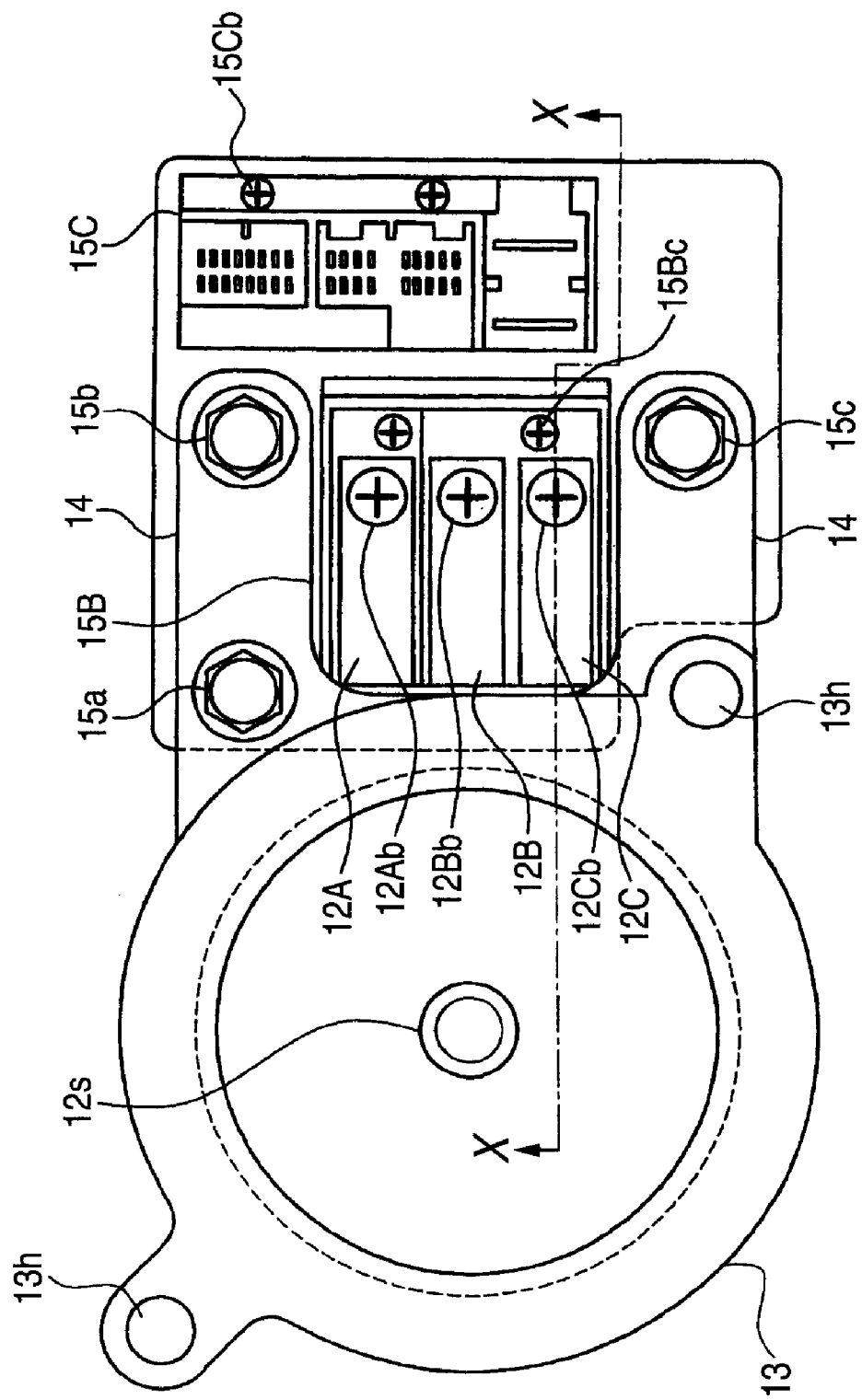
FIG. 3 is a bottom view showing a structure of an electric motor and a control unit which is an essential part of the aforesaid embodiment.
Figure 4:
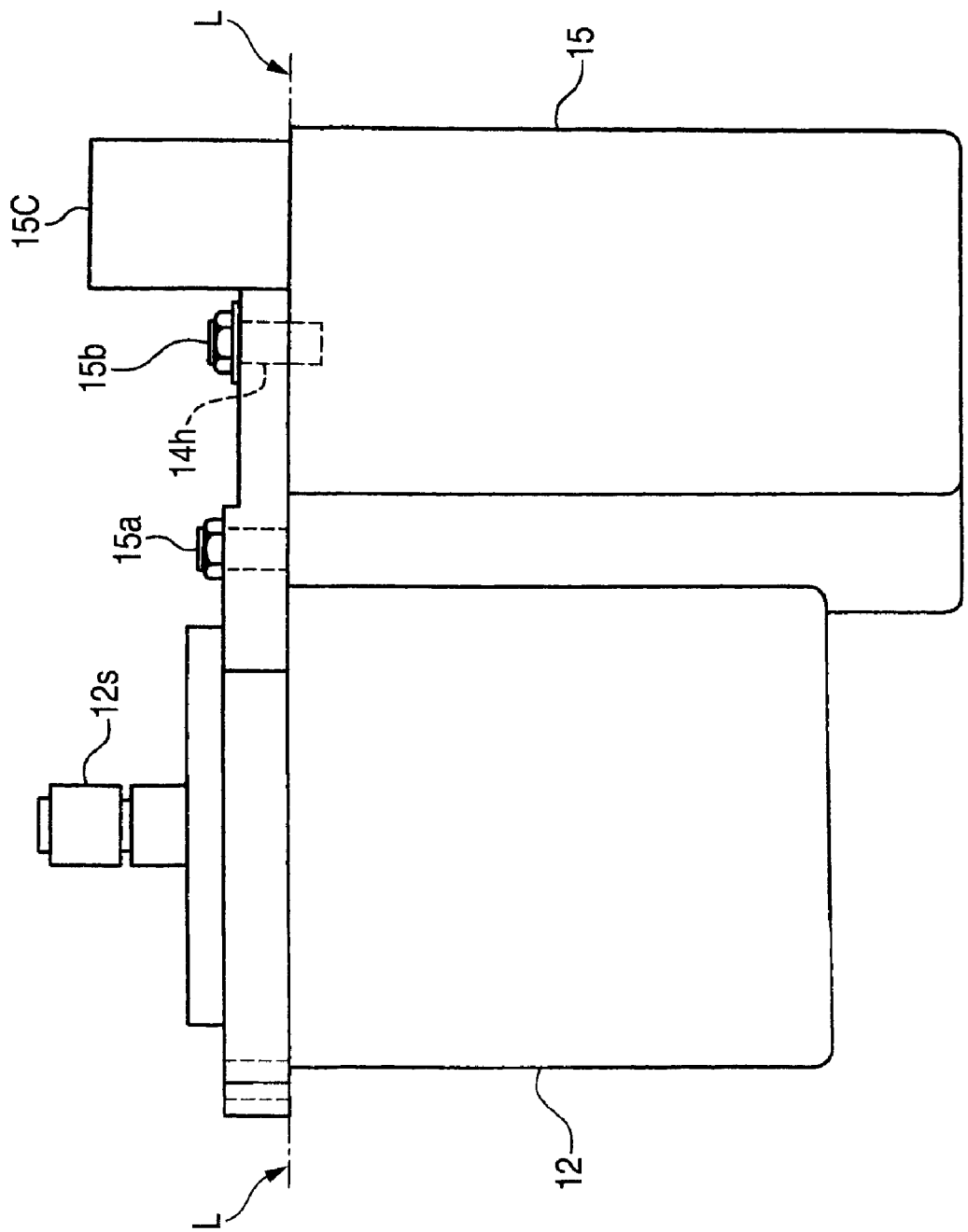
FIG. 4 is a side view of FIG. 3.

FIG. 3 is a bottom view as seen in a direction of an arrow mark B in FIGS. 1 and 2, showing relation of arrangement between the electric motor 12 and the control unit 15U. FIG. 4 is a side view of FIG. 3.

As shown in FIG. 3, a part of the flange part 13 is protruded in a circumferential direction (in this embodiment, the flange part 13 is protruded rightward at two positions substantially in C-shape) to form a flange protruded part 14. This flange protruded part 14 is formed with bolt holes 14h at three positions, and fixing bolts 15a, 15b, 15c are fitted into these bolt holes 14h. A face of this flange protruded part 14 opposed to the main body of the electric motor 12 (a lower face of the flange protruded part 14 which is shown by an alternate long and short dash line in FIG. 4, hereinafter referred to as "a mounting face L") is worked to be flat. As shown in FIG. 4, a mounting face of the control unit 15U (a lower face of the control unit 15U as shown in FIG. 2) is butted against this mounting face L, and the control unit 15U is detachably fixed to the mounting face L of the flange protruded part 14 by means of the fixing bolts 15a, 15b and 15c.

A connector 15C and a terminal board 15B are detachably mounted on the lower face of the flange protruded part 14, that is, the mounting face of the control unit 15U which is mounted on the mounting face L, by means of small screws 15Cb and 15Bc respectively. This connector 15C takes various signals concerning running state of the vehicle such as the detected value of the steering torque which has been outputted from the aforesaid steering torque sensor into the controller 15. The terminal board 15B functions as an electrical connection part to the electric motor 12. Three output terminals 23A, 23B, and 23C (See FIG. 6) having tap holes (not shown) are formed in parallel on this terminal board 15B. As shown in FIG. 3, these output terminals 23A, 23B, 23C are fastened to end parts of bus bars 12A, 12B, and 12C extended from the electric motor 12 by means of small screws 12Ab, 12Bb, and 12Cb.

Figure 5:
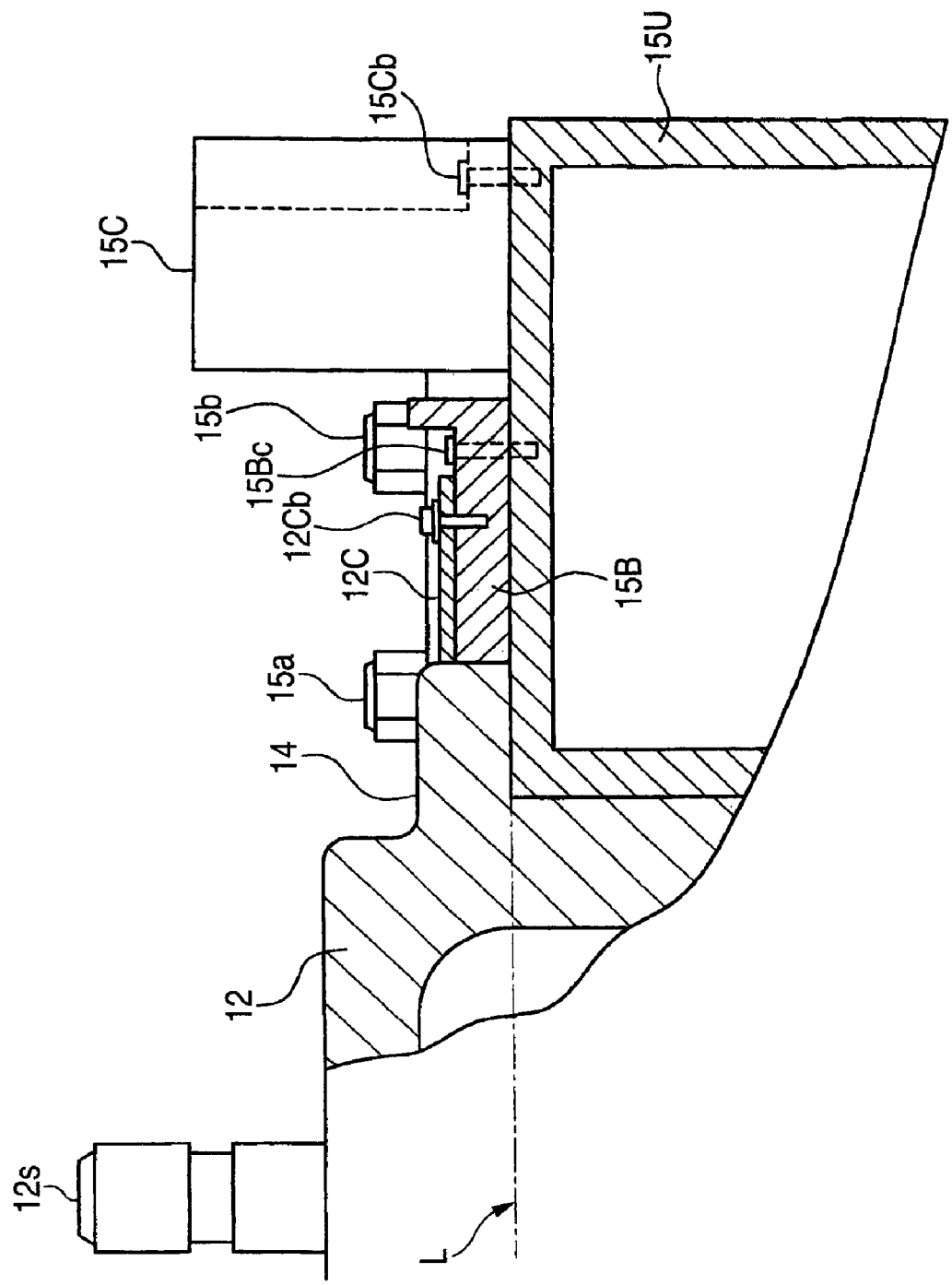
FIG. 5 is a sectional view taken along a line X-X in FIG. 3, as seen in a direction of arrow marks.

FIG. 5 is a sectional view taken along a line X-X in FIG. 3, as seen in a direction of arrow marks, showing the above described members, namely, the electric motor 12, the control unit 15U, the connector 15C, and the terminal board 15B in the mounted state.

As described above, the electric power steering apparatus is so constructed that the respective mounting faces of the electric motor 12, the control unit 15U, the connector 15C, and the terminal board 15B are on the same plane as the aforesaid mounting face L. Therefore, it is possible to mount these members in a single working step. As the results, mounting and assembling works of the members can be efficiently performed, and the manufacturing cost can be reduced.

Working steps for mounting and assembling these members are not particularly limited. For example, after the connector 15C and the terminal board 15B have been assembled to the control unit 15U as a first step, this control unit 15U may be assembled to the flange protruded part 14 of the electric motor 12 to set up the entire device, and thereafter, this flange protruded part 14 may be attached to the mounting member of the steering mechanism.

Figure 6:
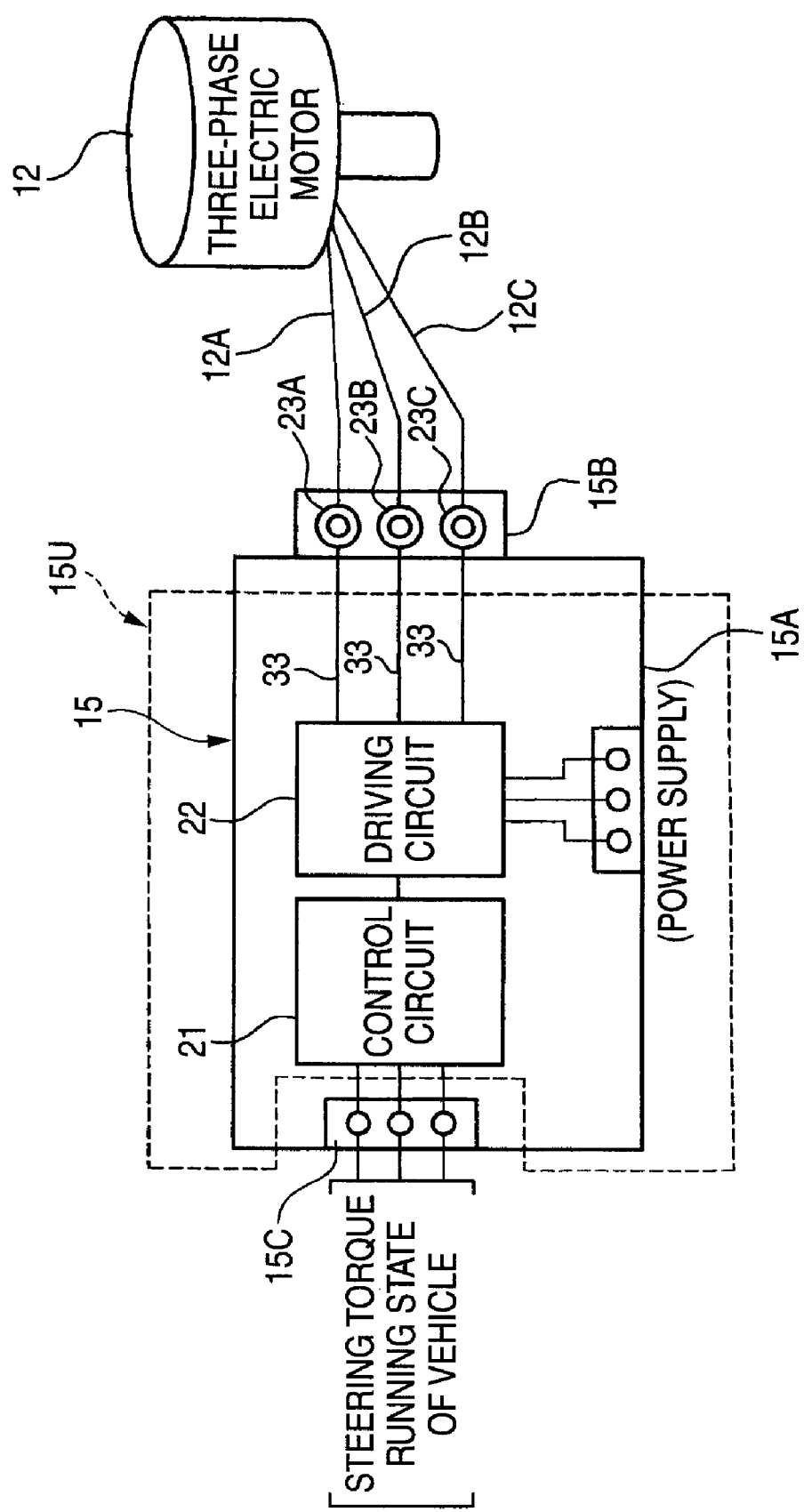
FIG. 6 is a schematic view for explaining function of a controller in the aforesaid embodiment.

FIG. 6 schematically shows a structure of the controller 15 provided in the control unit 15U. As shown in FIG. 6, the controller 15 includes a board 15A. A control circuit 21 and a driving circuit 22 are mounted on this board 15A. Various data concerning the running state and so on of the vehicle as described above are sent to the control circuit 21 via the connector 15C. The control circuit 21 starts a determined program which has been stored in advance, to process the inputted data on the bases of algorism for assisting the steering force which is given by this program, and transmits results of the process to the driving circuit 22 at a determined timing. Then, the results of the process can be obtained, for example, as a duty ratio for switching power supply which is supplied to the driving circuit 22. In this manner, the driving circuit 22 outputs a driving electric power for driving the electric motor 12 on the bases of control by the control circuit 21. This output is transmitted to the output terminals 23A, 23B, 23C through wirings 33.

As described above, according to this electric power steering apparatus, the electric motor 12 and the control unit 15U are arranged in proximity to each other in a detachable manner, by means of the bus bars 12A, 23B, 12C having a short length. For this reason, the above described advantages by reducing the length of the electric wirings can be obtained. Specifically, the manufacturing cost can be reduced, by making the device compact and saving the cost for the material, and quality of the device can be enhanced, by decreasing electric power loss, noises, and heat generation. In addition, because the respective mounting faces of the electric motor 12, the control unit 15U, the connector 15C, and the terminal board 15B are so formed as to be on the same plane as the aforesaid mounting face L, it is possible to mount these members at the same time in a single working step. As the results, the manufacturing cost can be reduced due to the efficient mounting and assembling works of the members, as already described above.

Although the contents of the invention have been described referring to the embodiment, the invention is not necessarily limited to the above described embodiment.

For example, the electric power steering apparatus of the column assist type is exemplified in the above described embodiment, in which the electric motor 12 and the control unit 15U provided with the connector 15C and the terminal board 15B are directly mounted on the steering column 20 as the mounting member of the steering mechanism. However, the electric power steering apparatus according to the invention may be applied to the devices of other types, for example, the device of a pinion assist type or a rack assist type. Specifically, in case where the electric motor 12 and the control unit 15U are mounted on the steering mechanism, they can be mounted on a pinion shaft in case of the pinion assist type, and can be mounted on a rack shaft in case of the rack assist type.

As the mounting member of the electric motor 12, an appropriate member of the steering mechanism can be used, provided that the electric power steering apparatus according to the invention can be constructed. Further, for the purpose of favorably removing heat of the controller 15 by transferring the heat to a member having a large heat capacity, it would be preferable that the steering column is selected as the mounting member of the electric motor 12, as described above, and the flange protruded part 14 is directly mounted on this steering column, in case where the electric power steering apparatus is of the column assist type.

Although the invention has been fully described referring to the specified embodiment, it is apparent to those skilled in the art that various modifications and amendments may be added without departing from spirit and scope of the invention.

This invention is based on Japanese Patent Application No. 2005-298525 filed on Oct. 13, 2005, the contents of which are hereby incorporated by reference.

INDUSTRIAL APPLICABILITY

According to the invention, the electric power steering apparatus is so constructed that the mounting face of the electric motor with respect to the control unit, the mounting face of the terminal board provided on the control unit and used for electrical connection with the electric motor, and the mounting face of the connector mounted on the control unit are on the same plane. Therefore, it is possible to mount these members at the same time in a single working step. As the results, the mounting and assembling works of the members can be efficiently performed, and the manufacturing cost can be reduced.

The invention claimed is:

1. An electric power steering apparatus comprising:
   a steering system into which steering torque is inputted;
   an electric motor which imparts steering assist force to the steering system;
   a controller which controls an energizing state of the electric motor according to the steering torque; and
   a control unit provided with a terminal board and a connector which are electrically connected to the electric motor,
   wherein a mounting face of the electric motor with respect to the control unit, a mounting face of the terminal board with respect to the control unit, and a mounting face of the connector with respect to the control unit are arranged on a same plane.

2. The electric power steering apparatus according to claim 1, wherein the mounting face of the electric motor with respect to the control unit is defined by a flange protruded part which is protruded from a flange part of the electric motor.

3. The electric power steering apparatus according to claim 1, wherein respective mounting members of the electric motor, the control unit, the terminal board and the connector are adapted to be attached or detached with respect to the same plane by fastening pieces.

4. The electric power steering apparatus according to claim 1, wherein a torque sensor which detects the steering torque is further provided, and the connector is connected to the torque sensor, whereby an electric signal corresponding to the steering torque is inputted into the controller via the connector.

5. The electric power steering apparatus according to claim 1, wherein a signal concerning running state of a vehicle is inputted into the controller via the connector.

6. The electric power steering apparatus according to claim 1, wherein the electric motor and the control unit are detachably connected to each other via a bus bar.

* * * * *